2,998,176
Patented Aug. 29, 1961

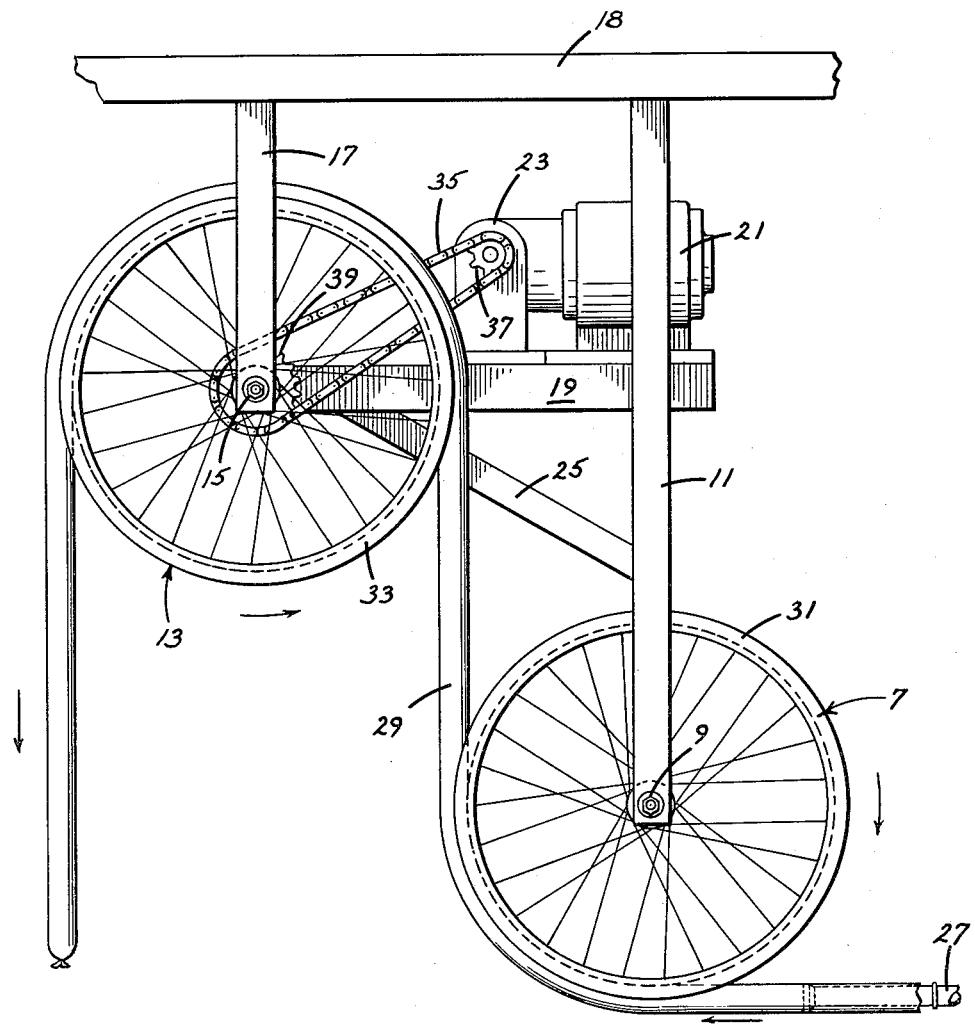

2,998,176
STUFFING MACHINE TAKE-OFF MECHANISM
Frederick J. Hill, Wallingford, Pa., assignor to American Viscose Corporation, Philadelphia, Pa., a corporation of Delaware
Filed May 23, 1957, Ser. No. 661,086
2 Claims. (Cl. 226—188)

This invention relates, in general, to the production of stuffed products, and particularly to a take-off mechanism for maintaining a stuffed product casing under tension during its formation, and for positively drawing a stuffed product away from its stuffing station at a uniform rate and with a minimum of bending.

As disclosed in the copending United States patent application of William E. Meissner et al., Method and Apparatus for Making Stuffed Products, Serial No. 661,055, filed May 23, 1957, films which were heretofore considered unsuitable for making stuffed products with conventional stuffing equipment may be transformed into satisfactory casings by maintaining the same under a uniform and constant tension during the casing formation and stuffing. In this manner, any film edge curl, folds, or wrinkles are removed before the film is shaped and sealed into a casing form, and thus insures that the stuffed product will be free from pinhole leaks or weakened areas. It has been further discovered, as set forth in the application of William E. Meissner et al., that humidification of the casing just prior to stuffing eliminates any tendency for the casing to absorb moisture from the plastic stuffing material and, equally important, permits the stuffed product to negotiate relatively sharp bends without any risk of rupture.

In view of these discoveries in the production of stuffed products, it is a primary object of the present invention to provide an improved and generally more satisfactory take-off mechanism for positively drawing the stuffed product away from its stuffing station, and for maintaining the casing in a tensioned condition during its formation.

Another object of the invention is to provide an apparatus which permits the satisfactory collection of stuffed products without subjecting the same to sharp bends or repeated flexures.

A still further object of the invention is the provision of a take-off mechanism capable of applying a positive pulling force on a stuffed product along a considerable portion of its length.

A still further object is to provide a means for continuously removing a stuffed product away from the discharge end of a stuffing machine along an arched path having smooth and gradual curves.

These and other objects and advantages of the invention will be apparent from the following description and accompanying figure of the drawing which illustrates a side view of the take-off mechanism of the present invention.

In general, the take-off mechanism of the present invention is designed for use with a stuffing machine as disclosed in the above-noted patent application of William E. Meissner et al.: and includes a pair of flanged wheels, the peripheries of which engage with the stuffed product and guide the same along a smooth curvilinear path. The wheels of the take-off mechanism here disclosed, are spaced both vertically and horizontally from each other, with the wheel nearest the stuffing machine nozzle serving to initially guide the stuffed product along its desired path as it is positively drawn by the other of the flanged wheels.

Referring now to the drawing, the take-off mechanism of the present invention includes a wheel 7 rotatably mounted on a shaft 9 which extends between a pair of laterally spaced arms 11. A second wheel 13, which constitutes the driving means of the take-off mechanism, is similarly supported on a shaft 15 carried by a pair of spaced arms 17, with both pairs of arms depending from a suitable support structure, as for example an overhead framework as shown at 18. A platform 19 is secured to the arms 11 and 17 and supports an air motor 21 and a speed reducer 23, both of which may be of conventional construction. The platform 19, along with diagonal braces 25, impart stability to the arrangement, and it is of course understood that additional struts may be provided to further rigidify the structure, if necessary.

The wheel 7 is disposed adjacent to the stuffing machine nozzle, shown in part at 27, and serves primarily to initially guide a stuffed product 29 along its desired path. It will be noted that the continuous product 29 follows a generally straight-line course as it leaves the nozzle 27 and is deflected by the wheel 7 along a smooth arc without subjecting the same to any sharp bends. A peripheral flange 31, of concave cross-section, is provided on the wheel 7 and engages a substantial portion of the stuffed product 29. This construction permits the wheel 7 to be driven solely by the movement of the stuffed product without in any manner distorting the product shape.

The wheel 13 is elevated and spaced laterally relative to the wheel 7, and is also formed with a flanged periphery 33 similar to the flange 31 described above. As heretofore noted, the wheel 13 is positively driven in a counterclockwise direction, as viewed in FIGURE 1, by the air motor 21 through the speed reducer 23 and a link chain 35, the latter of which is trained over sprockets 37 and 39.

In operation, the film or sheet material is initially laced through the stuffing machine and is manually pulled over the stuffing nozzle 27 as a tubular casing. The nozzle 27 is preferably formed with external projections and an outwardly flared discharge end for reasons as set forth in the patent application noted above. Once a casing having a satisfactory seal is obtained, stuffing material in a plastic condition is delivered through the nozzle and into the casing. The resulting stuffed product 29 is then tangentially engaged with the flange 31 of the wheel 7 and is passed over the flange 33 of the wheel 13, as illustrated in the drawing. After this preliminary lacing, the take-off mechanism of the present invention is set in motion by rotating the wheel 13 in the direction illustrated. At this stage, and during the remainder of the stuffing operation, the finished product is automatically and continuously removed from the stuffing station with a uniform and constant pull as applied by the driving wheel 13. As the stuffed product leaves the wheel 13, it can be easily collected or passed on to further treating apparatus without in any manner affecting the stuffing operation or involving any large accumulation of the stuffed product along its course of travel.

It will be observed that the stuffed product 29 engages the flange of the wheel 7 substantially along a 90° arc of contact and is thus gradually deflected to an upward path of travel. In passing over the drive wheel 13, the stuffed product 29 actually rests upon the peripheral flange 33 for approximately a 180° contact therewith. In this manner, the positive pulling force of the drive wheel 13 is applied to a considerable length of the stuffed product to prevent stress concentrations and to insure the uniformity of the product shape. It will of course be understood that the relative positions of the wheels 7 and 13 may be varied without departing from the spirit and scope of the present invention, providing that their ultimate positions are such as to impart a uniform pull to the stuffed product without subjecting the same to too sharp a bend. Further, while the wheels 7 and 13 have been illustrated as having spokes, merely from the standpoint of providing a lighweight construction, it will be apparent that disk-type wheels may be employed with equally effective operation.

From the above description, it is evident that the take-off mechanism of the present invention serves to uniformly and continuously remove the stuffed product from the stuffing machine nozzle, and in addition maintains the film under the desired degree of tension during its folding, sealing, and stuffing stages.

It is to be understood that the foregoing description is merely illustrative and that changes and variations may be made without departing from the spirit and scope of the invention as defined in the appended claims.

I claim:

1. In a stuffing machine having a nozzle for delivering a stuffing material into a casing as it travels over the discharge end thereof, a take-off mechanism for use in drawing a stuffed product away from the stuffing machine nozzle including a first wheel rotatably mounted directly adjacent to the discharge end of the stuffing machine nozzle, said first wheel being an idler wheel and having a peripheral flange of concave cross-section for engaging with the stuffed product and initially guide the same along a curvilinear path, a second wheel rotatably mounted in horizontally and vertically spaced relationship with said first wheel, said second wheel having a peripheral flange of concave cross-section for engaging with a substantial portion of the stuffed product, and means for rotating said second wheel to draw the stuffed product along its desired path.

2. Apparatus as defined in claim 1 wherein said nozzle extends along a plane substantially tangent to the periphery of said first wheel, and the periphery of said first and second wheels are substantially tangent to a common vertical plane.

References Cited in the file of this patent

UNITED STATES PATENTS

| | | |
|---|---|---|
| 1,639,270 | Potter | Aug. 16, 1927 |
| 1,642,353 | Arey | Sept. 13, 1927 |
| 2,054,786 | Alibert | Sept. 22, 1936 |
| 2,133,463 | Molin | Oct. 18, 1938 |
| 2,871,502 | Whisnant | Feb. 3, 1959 |

FOREIGN PATENTS

| | | |
|---|---|---|
| 765,007 | Great Britain | Jan. 2, 1957 |